(12) United States Patent
Russell, III et al.

(10) Patent No.: US 10,585,422 B2
(45) Date of Patent: Mar. 10, 2020

(54) PORTABLE FIELD MAINTENANCE TOOL SYSTEM HAVING INTERCHANGEABLE FUNCTIONAL MODULES

(71) Applicant: FISHER-ROSEMOUNT SYSTEMS, INC., Round Rock, TX (US)

(72) Inventors: Alden C. Russell, III, Minnetonka, MN (US); Alan R. Dewey, Plymouth, MN (US); Brad Mathiowetz, Burnsville, MN (US); Todd M. Toepke, Eden Prairie, MN (US); Stephen Armstrong, Savage, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 675 days.

(21) Appl. No.: 15/216,810

(22) Filed: Jul. 22, 2016

(65) Prior Publication Data

US 2018/0024534 A1    Jan. 25, 2018

(51) Int. Cl.
*G05B 19/414*    (2006.01)
*G05B 19/042*    (2006.01)
(Continued)

(52) U.S. Cl.
CPC ..... *G05B 19/4148* (2013.01); *G05B 13/0205* (2013.01); *G05B 19/041* (2013.01);
(Continued)

(58) Field of Classification Search
CPC ............ G05B 19/4148; G05B 19/0426; G05B 13/0205; G05B 19/041;
(Continued)

(56) References Cited

U.S. PATENT DOCUMENTS 5,999,740 A    12/1999 Rowley
6,035,423 A    3/2000 Hodges et al.
(Continued)

FOREIGN PATENT DOCUMENTS

CN    101410800 A    4/2009
EP    1 816 530 A1    8/2007
(Continued)

OTHER PUBLICATIONS

Beamex MC5 (discontinued) description, Retrieved from the Internet at http://www.beamex.com/beamex_products/MC5-%28discounted%29/na15ghgl/355ca6b7-66ff-469f-9bd4-1f26c0870452#Features> (Jul. 8, 2016).
(Continued)

*Primary Examiner* — Karen Kusumakar
*Assistant Examiner* — Adam S Bowen
(74) *Attorney, Agent, or Firm* — Marshall, Gerstein & Borun LLP

(57)    ABSTRACT

A portable field maintenance tool system for performing a plurality of different functional tasks on one or more equipment assets in a plant includes a handheld base and a plurality of functional modules for attachment to the handheld base. Each functional module, when operatively attached to the handheld base, interacts with computer circuits on the handheld base to perform a pre-defined one or more of the functional tasks. A portable handheld field maintenance tool for performing one or more pre-selected ones of the functional tasks on an equipment asset in a plant is formed by operatively mounting any one of the functional modules to the handheld base.

24 Claims, 5 Drawing Sheets

(51) Int. Cl.
*G05B 13/02* (2006.01)
*G05B 19/04* (2006.01)
*G06Q 10/00* (2012.01)

(52) U.S. Cl.
CPC ......... *G05B 19/0426* (2013.01); *G06Q 10/20* (2013.01); *G05B 2219/14064* (2013.01); *G05B 2219/15045* (2013.01); *G05B 2219/23389* (2013.01); *G05B 2219/23406* (2013.01); *G05B 2219/25294* (2013.01); *G05B 2219/37095* (2013.01)

(58) Field of Classification Search
CPC ........... G05B 2219/23389; G05B 2219/15045; G05B 2219/14064; G05B 2219/25294; G06Q 10/20
USPC .......................................................... 700/19
See application file for complete search history.

(56) References Cited

U.S. PATENT DOCUMENTS

| | | | |
|---|---|---|---|
| 6,282,709 B1 | 8/2001 | Reha et al. | |
| 6,889,166 B2 | 5/2005 | Zielinski et al. | |
| 7,010,294 B1 | 3/2006 | Pyotsia et al. | |
| 7,016,741 B2 | 3/2006 | Arntson | |
| 7,177,122 B2 | 2/2007 | Hou et al. | |
| 7,227,656 B1 | 6/2007 | Kato | |
| 7,289,994 B2 | 10/2007 | Nixon et al. | |
| 7,328,078 B2 | 2/2008 | Sanford et al. | |
| 7,421,531 B2 | 9/2008 | Rotvold et al. | |
| 7,539,978 B1 | 5/2009 | Haddox et al. | |
| 7,620,948 B1 | 11/2009 | Rowe et al. | |
| 7,675,932 B2 | 3/2010 | Schumacher | |
| 7,840,296 B2 | 11/2010 | Sanford et al. | |
| 7,975,266 B2 | 7/2011 | Schneider et al. | |
| 8,055,371 B2 | 11/2011 | Sanford et al. | |
| 8,127,241 B2 | 2/2012 | Blevins et al. | |
| 8,204,717 B2 | 6/2012 | McLaughlin et al. | |
| 8,286,154 B2 | 10/2012 | Kaakani et al. | |
| 8,458,659 B2 | 6/2013 | Resnick et al. | |
| 8,626,916 B2 | 1/2014 | Armstrong et al. | |
| 8,766,794 B2 | 7/2014 | Ferguson et al. | |
| 9,003,387 B2 | 4/2015 | Van Camp et al. | |
| 9,244,455 B2 | 1/2016 | Peterson et al. | |
| 2004/0039458 A1 | 2/2004 | Mathiowetz et al. | |
| 2004/0181787 A1 | 9/2004 | Wickham et al. | |
| 2004/0230401 A1 | 11/2004 | Duren et al. | |
| 2005/0132349 A1 | 6/2005 | Roberts et al. | |
| 2005/0228798 A1 | 10/2005 | Shepard et al. | |
| 2007/0004168 A1 | 1/2007 | Zips | |
| 2007/0022403 A1 | 1/2007 | Brandt et al. | |
| 2007/0118699 A1 | 5/2007 | Synard et al. | |
| 2007/0169079 A1 | 7/2007 | Keller et al. | |
| 2008/0040449 A1 | 2/2008 | Grant et al. | |
| 2008/0049984 A1* | 2/2008 | Poo .......................... G06F 21/32 382/115 | |
| 2008/0126005 A1* | 5/2008 | Guenter ............... G01F 23/0061 702/140 | |
| 2008/0268784 A1* | 10/2008 | Kantzes .............. G05B 19/0423 455/66.1 | |
| 2009/0094462 A1 | 4/2009 | Madduri | |
| 2009/0133012 A1 | 5/2009 | Shih | |
| 2009/0138870 A1 | 5/2009 | Shahindoust et al. | |
| 2009/0320125 A1 | 12/2009 | Pleasant, Jr. et al. | |
| 2010/0146497 A1 | 6/2010 | Kogan et al. | |
| 2011/0087461 A1 | 4/2011 | Hollander et al. | |
| 2011/0224808 A1 | 9/2011 | Lucas et al. | |
| 2012/0038760 A1 | 2/2012 | Kantzes et al. | |
| 2013/0024495 A1* | 1/2013 | Armstrong ......... G05B 19/0426 709/203 | |
| 2013/0070745 A1 | 3/2013 | Nixon et al. | |
| 2013/0214898 A1 | 8/2013 | Pineau et al. | |
| 2014/0018955 A1 | 1/2014 | Asakawa et al. | |
| 2014/0019768 A1 | 1/2014 | Pineau et al. | |
| 2014/0047107 A1 | 2/2014 | Maturana et al. | |
| 2014/0056173 A1* | 2/2014 | Nakamura ............. H04L 69/18 370/254 |
| 2014/0181955 A1 | 6/2014 | Rosati | |
| 2014/0273847 A1 | 9/2014 | Nixon et al. | |
| 2015/0024710 A1 | 1/2015 | Becker et al. | |
| 2015/0098158 A1 | 4/2015 | Kemp et al. | |
| 2015/0281227 A1 | 10/2015 | Fox Ivey et al. | |
| 2016/0026813 A1 | 1/2016 | Neitzel et al. | |
| 2016/0132046 A1 | 5/2016 | Beoughter et al. | |
| 2016/0154394 A1 | 6/2016 | Peterson et al. | |
| 2016/0299175 A1 | 10/2016 | Dewey et al. | |
| 2017/0078265 A1 | 3/2017 | Sundaresh et al. | |
| 2017/0257378 A1 | 9/2017 | Sprenger et al. | |

FOREIGN PATENT DOCUMENTS

| | | |
|---|---|---|
| EP | 1 906 623 A1 | 4/2008 |
| EP | 2 026 223 A2 | 2/2009 |
| EP | 2 067 088 A2 | 6/2009 |
| EP | 2 782 073 A1 | 9/2014 |
| GB | 2 465 495 A | 5/2010 |
| GB | 2 535 839 A | 8/2016 |
| GB | 2 539 311 A | 12/2016 |
| GB | 2 548 007 A | 9/2017 |
| JP | 2002-007129 A | 1/2002 |
| JP | 2004-234056 A | 8/2004 |
| JP | 2009-187420 A | 8/2009 |
| WO | WO-2008/045258 A2 | 4/2008 |
| WO | WO-2013/184117 A1 | 12/2013 |
| WO | WO-2016/020165 A1 | 2/2016 |
| WO | WO-2017/085923 A1 | 5/2017 |

OTHER PUBLICATIONS

Beamex MC6 Advanced Field Calibrator and Communicator, Product Brochure (2016).
Costall, "Essential Concepts of Intrinsic Safety," Spark Institute. Retrieved from the internet at http://www.sparkinstitute.ca/wp/WP00_-_Essential_Concepts_of_Intrinsc_Safety.pdf (May 24, 2016).
Emerson Process Management, "475 Field Communicator." Retrieved from the internet at http://www2.emersonprocess.com/siteadmincenter/PM%20Asset%20Optimization%20Documents/ProductReferenceAndGuides/475_ru_usermanual.pdf (May 26, 2016).
Examination Report Under Section 18(3) in Application No. GB1015879.8, dated Mar. 13, 2014.
Examination Report Under Section 18(3) in Application No. GB1015879.8, dated Mar. 20, 2015.
Examination Report under Section 18(3) dated Oct. 2, 2014 in Application No. GB1015879.8, 3 pgs.
Fieldbus Engineer's Guide, Pepperl+Fuchs (May 2013), 474 pages.
Fieldbus Foundation, "Foundation Fieldbus Application Guide; 31,25 kbit/s Intrinsically Safe Systems." Retrieved from the internet at http://www.fieldbus.org/images/stories/enduserresources/technicalreferences/documents/instrinsciallysafesystems.pdf (May 26, 2016).
First Office Action for corresponding Chinese Patent Application No. 201010572412.4, dated Jun. 5, 2014, 8 pgs.
Fluke 709 Precision Loop Calibrator, User Manual, © 2013 Fluke Corporation.
Fluke 709/709H Precision Loop Calibrator, Quick Reference Guide (2013).
GE Measurement & Control Systems, Druck DPI 620-IS advanced modular calibrator user manual, © Druck Limited 2010.
Office Action for corresponding Japanese Patent Application No. 2010-215391, dated Aug. 19, 2014, 4 pgs.
Omega, "Digital Signal Transmission." Retrieved from the internet at https://www.omega.com/literature/transactions/volume2/digitalsignal4.html (May 26, 2016).
Omega, "Understanding What's Meant by Intrinsically Safe." Retrieved from the internet at <http://www.omega.com/technical-learning/understanding-what-is-meant-by-intrinsically-safe.html>.
Search Report for Application No. GB1015879.8, dated Jan. 13, 2011.

(56) References Cited

OTHER PUBLICATIONS

U.S. Appl. No. 14/682,714, filed Apr. 9, 2015.
U.S. Appl. No. 15/214,949, filed Jul. 20, 2016.
U.S. Appl. No. 15/214,975, filed Jul. 20, 2016.
U.S. Appl. No. 15/216,810, filed Jul. 22, 2016.
Wikipedia, "Intrinsic Safety." Retrieved from the internet at https://en.wikipedia.org/wiki/Intrinsic_safety (May 24, 2016).
Wiring and Installation 31.25 kbit/s, Voltage Mode, Wire Medium, Application Guide, FoundationTM Fieldbus, © 1996 Fieldbus Foundation.
User Manual for Beamex® MC6 Advanced Field Calibrator and Communicator (2012-2015).
Search Report for Application No. GB1709952.4, dated Nov. 29, 2017.
Search Report for Application No. GB1710027.2, dated Oct. 19, 2017.
Search Report for Application No. GB1710029.8, dated Dec. 21, 2017.
Search Report for Application No. GB1710117.1, dated Oct. 23, 2017.
Search Report for Application No. GB1710119.7, dated Oct. 24, 2017.
Search Report for Application No. GB1710124.7, dated Oct. 20, 2017.
Search Report for Application No. GB1710125.4, dated Oct. 12, 2017.
Search Report for Application No. GB1710210.4, dated Oct. 26, 2017.
Search Report for Application No. GB1710211.2, dated Nov. 30, 2017.
Search Report for Application No. GB1710266.6, dated Dec. 19, 2017.
Search Report for Application No. GB1711106.3, dated Nov. 21, 2017.

* cited by examiner

PORTABLE FIELD MAINTENANCE TOOL SYSTEM HAVING INTERCHANGEABLE FUNCTIONAL MODULES

FIELD

This application relates generally to a portable field maintenance tool system for use in a plant, and more particularly, to a portable field maintenance tool system having interchangeable functional modules for performing a plurality of different functions from a single, portable platform.

BACKGROUND

Industrial plants include many different types of equipment assets for industrial and/or process automation and systems that require setup, monitoring, control, and/or maintenance. For example, equipment assets in a typical process plant may include field devices, rotating equipment, stationary equipment, and/or electrical power distribution equipment. Field devices may include equipment such as process pressure, temperature, level, and/or analytical measurement devices, flow meters, valve positioners, and/or switches. Rotating equipment may include equipment such as such as motors, pumps, compressors, and/or drives. Stationary equipment may include equipment such as mechanical vessels tanks, pipes, and so on. Electrical power distribution equipment may include equipment such as such as switch gear and/or motor control centers. Other assets may also be used.

Process control systems in an industrial plant, like those used in chemical and petroleum processes, typically include one or more process controllers communicatively coupled to at least one host or operator workstation and to one or more field devices via analog, digital, or combined analog/digital buses. The field devices, which may be, for example, valves, valve positioners, switches, and transmitters (e.g., temperature, pressure, and flow rate sensors), perform functions within the process plant, such as opening or closing valves and measuring process parameters. The process controllers receive signals indicative of process measurements made by the field devices and/or other information pertaining to the field devices, use this information to implement control routines, and subsequently generate control signals that are sent over the buses or other communication lines to control the operation of the field devices. With the information collected from the field devices and process controllers, an operator or a technician can execute one or more applications at an operator workstation that perform any desired function with respect to the process, such as, for example, configuring the process, viewing the current state of the process, and/or modifying the operation of the process.

In many cases, field devices and other industrial and/or process automation equipment assets may require on-site setup, configuration, testing, and maintenance. For example, before a field device can be installed at a particular location at a process control plant, the field device may need to be programmed and may then need to be tested before and after the field device is installed. Field devices that are already installed may also need to be regularly checked for maintenance reasons or, for example, when a fault is detected and the field device needs to be diagnosed for service or repair. Generally speaking, configuration and testing of field devices are performed on location using a handheld, portable maintenance tool. Because many field devices are installed in remote, hard-to-reach locations, it is more convenient for a user to test the installed devices in such remote locations using a handheld, portable tool rather than using a full configuration and testing device, which can be heavy, bulky, and non-portable, generally requiring the installed field device to be transported to the site of the diagnostic device.

In the case in which a field device or other equipment asset is at least partially operational and supplied with power via a local bus, a handheld maintenance tool or portable testing device ("PTD") can connect to a communication terminal of the field device to run a diagnostic routine. Generally, the field device and the PTD communicate over a two-wire or a four-wire communication connection or line, typically referred to as a bus. For example, FOUNDATION® Fieldbus devices and HART® devices are typically connected to a two-wire (or in some cases a four-wire) connection line or bus when installed in a plant environment. It is known to use a handheld device to connect to, for example, a Foundation Fieldbus or a HART communication line or other communication bus to communicate with devices connected to that communication line or bus.

In some cases, testing a field device or other equipment asset on location may not be possible unless power is supplied to the field device. This may occur, for example, when there is a power outage, when there is a power issue localized to the field device itself, or when one or more field devices are offline, i.e., in fault situations. Generally, power may be provided to the field device by connecting the field device to a power source via a two-wire power line. For example, FOUNDATION® Fieldbus devices are powered via the same terminals used for communicating with the fieldbus device. However, portable power considerations and Intrinsic Safety ("IS") standards restrict the manner in which power can be provided to a field device, especially when the field device is installed in a critical or dangerous process control system in the field.

In some cases, Intrinsic Safety ("IS") standards restrict the manner in which power and other communication signals can be provided to a field device or other equipment asset, especially when the equipment asset is installed in a critical or dangerous process control system in the field. Generally, IS considerations and design is focused on limiting the amount of energy available that could cause a spark sufficient to cause an ignition in a hazardous area with an atmosphere with an elevated chance of being highly flammable or explosive. For example, higher voltages are used for providing power to the field devices than the voltages that are used for communicating with the field devices. Additionally, certain safety measures must be implemented before powering a field device in the field. In particular, according to IS guidelines, a technician cannot switch on the power of a field device within the field device itself and cannot use devices that generate voltages over certain predetermined levels. The IS guidelines prohibit internal power switching and generation of larger voltages because field devices are often installed in proximity to volatile substances or volatile processes, and thus there is higher possibility of causing an explosion by arcing or generating sparks when a high voltage or a power connection is applied to the field device. For reference, an internal switch may be considered any switch that is integrally connected within or physically housed within a field device and/or that is fixed to the field device. Accordingly, the technician servicing the field device cannot use or install a switch within the field device to switch on the power to the device from a provisioned or redundant power line. In addition, IS considerations typically consider not only voltage, but also current, power, capacitance, inductance, and temperature/heat production.

Related IS guidelines also advise against switching on power within a PTD that is connected to a field device or other equipment asset and that is located within a vicinity of the field device. IS standards generally require manual intervention when applying power to a non-operating or a non-powered field device installed in the field. Although it may be desirable to configure existing PTDs with automatic power functions for powering a field device, this configuration is generally prohibited under the IS standards, especially when providing higher power signals to the field devices for powering the field devices or for testing purposes.

To comply with IS standards, some existing PTDs include an interface with four connection ports for coupling four lines or wires between the PTD and a field device or other equipment asset undergoing testing. Generally, a first pair of lines is used for transmitting communication signals at a first voltage range and a second pair of lines is used for powering the field device at a second and higher voltage or voltage range. The first pair of lines is primarily used whenever the field device is undergoing testing, and the second pair of lines/wires is used only when power is needed to be provided to the field device to enable the field device to execute a function (e.g., a test function or a configuration function). In this manner, additional power to the field device undergoing testing always requires manual intervention that includes connecting additional wires between the field device and the PTD. In short, IS standards have generally limited the development of portable field device testing equipment to require two separate sets of lines or lead sets and three or four ports for connecting a field device to the portable testing equipment.

Maintenance technicians in the process industries perform a wide variety of different tasks in a process plant, such as installation of instruments and other equipment assets, configuration and set-up, calibration, data collection, and troubleshooting of instruments and measurement loops. Performance of these different tasks typically requires a myriad of ever-changing portable tools, including, communicators, calibrators, power supplies, data collectors, analyzers and digital multimeters (DVM's), each with its own unique user interface, menus, and displays.

Installing and maintaining instruments and other equipment assets in a typical process plant requires multiple portable tools, such as a communicator for initial set-up and configuration, a calibrator for verification and adjustment of instrument output, and a digital multimeter for troubleshooting of loop wiring, connections, power supply, and the instrument itself. For example, maintaining rotating equipment (e.g. motors, pumps, and generators) may require additional tools for collecting and analyzing vibration data used to detect impending failure.

The potential presence of explosive gasses or dusts often pose additional requirements that these portable tools be tested and certified by agencies such as Factory Mutual or Canadian Standards Association, in order to be certified as intrinsically safe for use in hazardous areas, such as the IS standards discussed above. As a result, technicians often need to acquire and/or carry multiple specialized portable tools into the plant in order to perform the required work.

In view of these current conditions, it would be advantageous to reduce the number of tools that the maintenance technician needs to carry and work with in the process plant while installing and/or otherwise working on field devices in the process system.

SUMMARY

According to some aspects of the disclosure, a portable field maintenance tool system for performing a plurality of different functional tasks on one or more equipment assets in a plant is disclosed. The portable field maintenance tool system includes a handheld base and a plurality of functional modules for attachment to the handheld base. Each functional module, when operatively attached to the handheld base, interacts with computer circuits on the handheld base to perform a selected one of the functional tasks.

According to some aspects of the disclosure, a portable handheld field maintenance tool for performing tasks on an equipment asset in a plant includes a handheld base and a functional module that is releasably mountable to the handheld base. When the functional module is operatively mounted to the handheld base, the functional module interacts with software accessible to the handheld base to perform a pre-defined functional task relative to the equipment asset.

In some arrangements, the handheld base may include a computer processor, an electronic display to display information from the computer processor, a power source that provides power to the computer processor and the electronic display, and/or a plurality of first electrical connectors operatively carried together by a first housing. One or more software modules, each configured to perform a different pre-defined functional task relative to an equipment asset in a plant, may be accessible by the computer processor. The first housing may be shaped and sized as a handheld unit. The computer processor may be carried within the interior of the first housing. The electronic display may be carried by the first housing to display information from the computer processor to the exterior of the first housing. The power source may be carried within the first housing. The power source may be a battery. The first set of electrical connectors may be carried by the first housing and operatively reachable from the exterior of the first housing. The handheld base may include a user interface, such as physical and/or virtual input keys. The user interface may be carried by the first housing. The computer processor may recognize the functional modules and enable one or more of the software modules based on the recognition of the functional module.

In some arrangements, one or more of the functional modules may include a second set of electrical connectors that releasably couple with the first electrical connectors and a computer control circuit configured to perform the functional task. The second set of electrical connectors and the computer control circuit may be carried together as a unit by a second housing. At least a portion of the computer control circuit may be disposed inside the second housing.

One or more of the functional modules may include one or more interface connections that operatively connects to a field device or other portion of the process control system to perform at least one of the functional tasks. One or more of the interface connections may be carried by the second housing. By way of example, the interface connections may include any one or more of communication terminals, data collection terminals, electrical power terminals, ammeter terminals, barcode readers, RFID readers, and other types of connectors and/or interface mechanisms for interfacing with various parts of the process control system. One or more of the functional modules may include HART interface connections and/or Fieldbus interface connections.

The second housing may have an exterior mating surface that is complementary to a portion of an exterior surface of the first housing so as to lockingly mate to the exterior surface of the first housing when the functional module is operatively mounted to the handheld base. The second set of electrical connectors may operatively couple with the first set of electrical connectors when the functional module is operatively mounted to the handheld base.

Each functional module preferably releasably and operatively attaches separately to the handheld base with the second set of electrical connectors coupled to one or more of the first electrical connectors. In this manner, different functional modules may be swapped out from the handheld base, and selected depending on the function that a user wants to perform with the maintenance tool. For example, a first functional module may be operatively attached to the handheld base, used to perform a first one or more pre-selected functions, detached from the handheld base, and subsequently, a second functional module may be operatively attached to the handheld base and used to perform a second one or more pre-selected functions. One or more of the functional modules, when operatively attached to the handheld base, may interact with at least one respective one of the software modules to perform a selected one of the functional tasks.

In some arrangements, more than one functional module may be attached to the handheld base at the same time. For example, the handheld base may have two or more different mounting areas that are configured to be operatively attached to two or more different functional modules. The different mounting areas may have the same configuration and/or may have different configurations. For example a first shape configuration of a functional module may be configured to operatively mount to a first mounting area on the handheld base and a second shape configuration of a functional module may be configured to operatively mount to a second mounting area on the handheld base. Different mounting areas may be configured to have different functional modules of the same type of shape configuration mounted thereto. Thus, a large number of different configurations may be provided to allow different arrangements and types of functional modules to be operatively mounted to the handheld base, thereby providing a platform that can be easily configured to many different configurations depending on the user's preferences and/or needs.

The portable handheld field maintenance tool may be intrinsically safe. The handheld base and one or more of the functional modules, when operatively attached to the handheld base, may be intrinsically safe. Preferably, any one or more of the functional modules may be intrinsically safe while being operatively mounted to and/or disconnected from the handheld base.

One or more of the functional modules may be configured to perform tasks on equipment assets including field devices, rotating equipment, mechanical vessels, and/or electrical power distribution equipment. One or more of the functional modules may configured to perform any one or more of the following functional tasks: a device communicator; a loop power generator; loop validation; a data collector; a vibration data collector; a calibrator; configure and/or set-up a measurement instrument, such as a pressure transmitter; calibrate a temperature transmitter; measure electrical parameters of a field device; sense vibrations of a field device; and/or implement device diagnostics to troubleshoot a field device. Additional examples include functional modules that are configured to function as a portable industrial computer, functional modules that are configured to be used during operator rounds; functional modules that are configured to function as an ammeter; functional modules that are configured to function as a volt meter; and/or functional modules that are configured to function as a variable current source/control. Some functional modules may be configured to function as a camera and/or a flashlight and/or a flash. This is not an exhaustive list of possible functional module functions, and functional modules configured to perform other functions may also be provided in accordance with the principles of the present disclosure. Thus, an advantage of some aspects of the present disclosure is the ability to provide a modular platform for a portable field maintenance tool that can be expanded to have functional modules that not only perform currently known functions, but can also be used with modules that are configured to perform new and/or additional functions to additional or different equipment assets in the plant in the future.

In some arrangements, any one or more of the functional modules may include memory provided integrally or removably therewith for data storage, such as RAM, ROM, and so on. By providing a memory directly with the functional module, data collected with the functional module may be transferred directly with the functional module without necessarily having to use the handheld base. Similarly, data can be uploaded for use with the functional module directly without necessarily having to involve the handheld base. Thus, providing a memory data storage as part of the functional module can provide for greater modularity and/or flexibility for the user.

An advantage of a maintenance tool in accordance with one or more of these aspects, arrangements, and/or features is that different or the same functional modules can be easily swapped in and out while the user is in the field in the plant. In addition, when the maintenance tool is configured to be intrinsically safe, the user may also swap out functional modules in hazardous areas in the plant. This can save significant time in the field for a technician.

Additional optional and/or beneficial aspects, arrangements, features, and/or technical effects will become apparent upon detailed inspection of the figures and the following detailed description.

DETAILED DESCRIPTION

Figure 1:
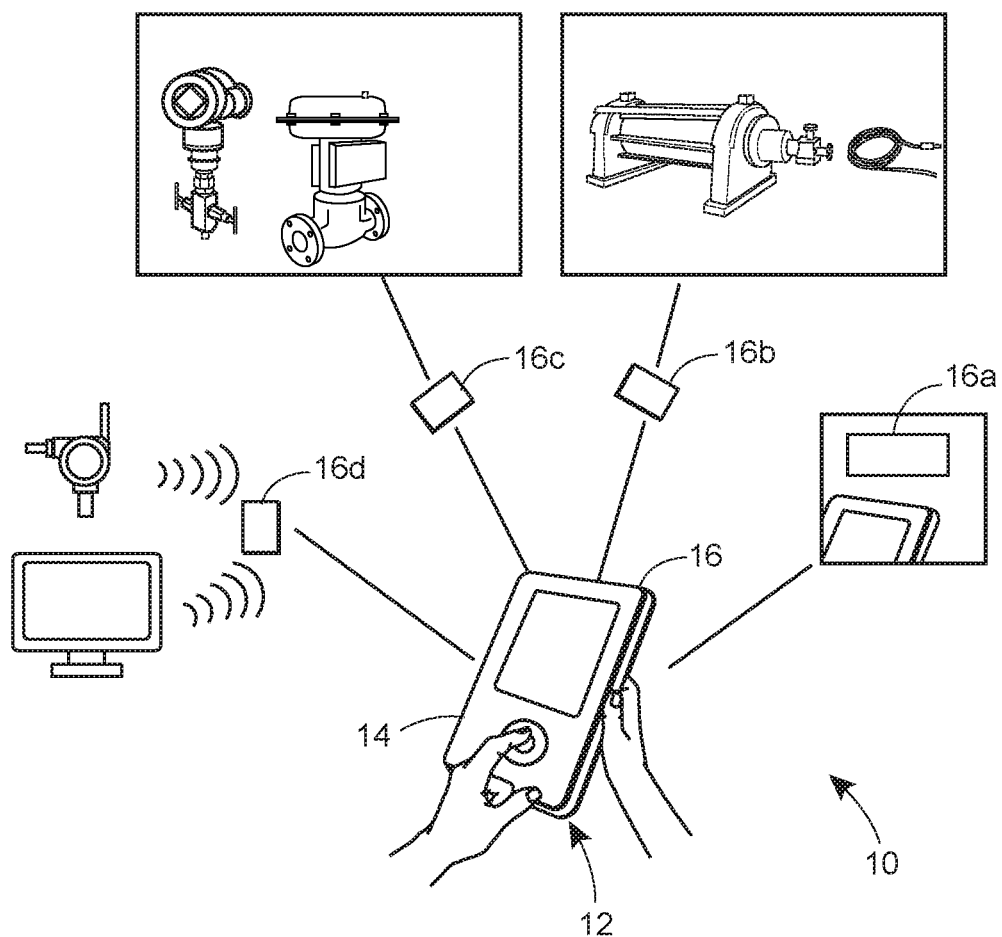
FIG. 1 is a schematic diagram of a portable handheld field maintenance system for equipment assets in a plant.

Before describing the specific examples shown in the drawings, some general aspects, arrangements, and features of a portable field maintenance tool system according to the disclosure are provided.

A portable field maintenance tool system according to the present disclosure may include a single handheld platform, such as a handheld base as described herein, and one or more of a plurality of plug-in functional modules, as described herein. The handheld platform provides a set of common features that can be used for several of the various functional tasks that the user may need to perform using different functional modules. Each of the functional modules includes hardware and/or software specific for performing one (or possibly more than one) of the functional tasks and may be interchangeably coupled to the handheld platform to allow the maintenance tool to perform the selected functional task. Preferably, the handheld platform is easily portable, such as having a form factor (e.g., size, shape, and weight) that a user can easily carry, hold, and manipulate by hand by in the field. In addition, the maintenance tool may be intrinsically safe such that the functional modules can be used and/or changed-out on the handheld platform in a hazardous area having flammable and/or explosive atmosphere, such as near a particular equipment asset, without having to move out of the hazardous area. Preferably, the maintenance tool meets the standards for intrinsic safety, for example, by conforming to standards of the Factory Mutual Research Corporation, the Canadian Standards Association, the International Electrotechnical Commission, the ATEX Directive, and/or similar safety standards. In this way, a user can perform multiple required functions (e.g. digital communication with devices, device maintenance, loop diagnostics, device calibration, collection of vibration or other data, mobile worker tasks, etc.), which previously would have required multiple completely separate tools, but now using a single handheld platform with an appropriately selected functional module. Having a common handheld platform according to some arrangements enables a user to leverage the common display, battery power, user interface, and connectors to perform very different functions. Using the same handheld platform and one or more of the various functional modules may allow the user to reduce the cost of tools and/or the number of tools they carry into the field.

In some arrangements, the handheld platform of a portable field maintenance tool accepts multiple plug-in functional modules such that different functional modules can be variously mounted and dismounted to and from a handheld base. In some arrangements, only one functional module can be operatively attached to the common platform at a time. However, in some arrangements, more than one functional module may be simultaneously operatively mounted to a handheld base. Each functional module may be configured to perform a different function in a process environment. For, example, these functions may include configuration and/or set-up of a measurement instrument, (e.g., a pressure transmitter), calibration of an instrument, (e.g., temperature transmitter), measurement of electrical parameters, collection, storage, and/or analysis of data, (e.g., vibration data from rotating equipment, and/or performance of device diagnostics, (e.g., to troubleshoot a problematic valve). Functional modules according to this disclosure are not limited to these functions, but may perform other and/or additional functions. Although the hardware and software in the functional modules used to perform these functions typically differ significantly, each of the functional modules is designed to leverage major components of the common hand-held platform, which may provide battery power, circuitry, graphic display, user interface, and/or a protective housing suitable for use in both safe and hazardous areas.

Some effects of using of a portable field maintenance tool having a common handheld platform and interchangeable functional modules according to various aspects of this disclosure may include: providing increased flexibility for users (for example, sending one functional module out for repair or calibration does not take the whole field maintenance tool out of service) reducing costs for users who otherwise would need to buy multiple unique built-for-purpose tools; simplifying user training requirements for multiple tools by providing common (similar) user interface experiences for several or all of the functional modules; and/or providing wireless communication (e.g. Wi-Fi) accessibility via any of the plug-in functional modules.

Turning now to the exemplary arrangements of the drawings, FIG. 1 illustrates a portable field maintenance tool system ("tool system") 10 according to aspects of the present disclosure. The tool system 10 includes a portable field maintenance tool ("maintenance tool") 12 for performing one or more pre-selected tasks to equipment assets in a plant. For example, the tool system 10 can be configured to perform pre-selected tasks on field devices, rotating equipment, stationary equipment, and/or electrical power distribution equipment. Preferably, the tool system 10 can be configured to perform pre-selected tasks on portions of a process control system, such as to various field devices and/or control and/or power loops or busses in a plant, such as a petrochemical, food processing, manufacturing, or similar plant or application. For ease of reference, further description of the tool system 10 relative to process control systems and field devices is understood to also include any other equipment asset in a plant, unless clearly described otherwise.

The maintenance tool 12 includes a handheld base 14 and one or more functional modules 16 that "plug-in", that is, operatively mount to the handheld base 14. In this example, four different functional modules 16a-d are illustrated. However, the tool system 10 may include more or fewer or different functional modules 16. Each functional module 16, for example, functional modules 16a-d, is specifically arranged to perform one or more pre-selected functions relative to one or more portions of the process control system. For example, the functional module 16a, when operatively mounted to the handheld base 14, enables the maintenance tool 12 to read radio frequency identification (RFID) tags, for example associated with various field devices located throughout a plant. The functional module 16b, when operatively mounted to the handheld base 14, enables the maintenance tool 12 to collect vibration data from a field device, such as a valve, actuator, pipe, etc. The functional module 16c, when operatively mounted to the handheld base 14, enables the maintenance tool 12 to communicate with one or more field devices via a communications and/or power bus or loop, such as a HART protocol control/power loop and/or a fieldbus protocol control/power bus and/or 4-20 mA analog signaling loops. The functional module 16d, when operatively mounted to the handheld base 14, enables the maintenance tool 12 to communicate wirelessly, such as with blue tooth, Wifi, and/or radio frequency transceivers, with one or more transmitters and/or receivers in the plant.

Figure 2:
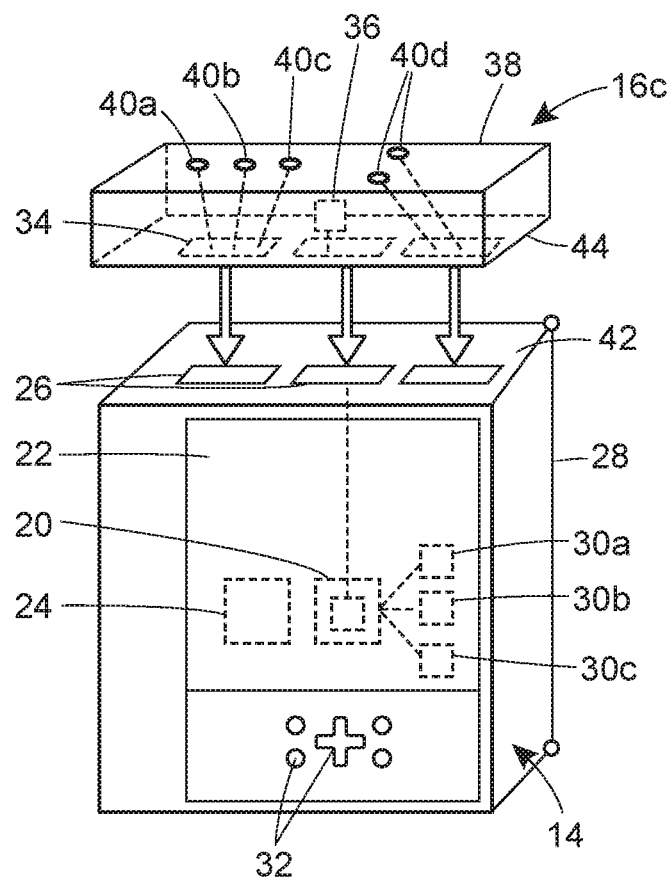
FIG. 2 is a schematic diagram of a portable handheld field maintenance tool of the system shown in FIG. 1.

With reference to FIG. 2, the handheld base 14 includes a computer processor 20, an electronic display 22 to display information from the computer processor to a user, a power source 24 that provides power to the computer processor and the electronic display, and a plurality of first electrical connectors 26. The computer processor 20, electronic display 22, and the power source are operatively carried together as a single handheld unit by a first housing 28. The handheld base 14 may have many different aesthetic shapes, sizes, and layouts, any of which may be configured to include the various features described herein, and are not limited to the exemplary aesthetic arrangements disclosed herein.

The computer processor 20 preferably include all appropriate electronic hardware, such as control circuits, memory storage, I/O devices, drivers, and/or software for implementing any one or more of the various functions described variously herein, as would be understood in the art.

The electronic display 22 may include, for example, a display screen, such as an LED, LCD, plasma, and/or any other type of electronic display, and any appropriate hardware and/or software drivers therefor, as would be understood in the art.

The power source 24 may be any type of electrical power source appropriate for powering the various hardware and functionalities desired to be performed by the maintenance tool 12 with any one or more of the various functional modules 16 operatively attached thereto. The power source 24 may be a direct current electrical supply, such as a battery, and/or other types of electrical power sources 24 may also be used.

The electrical connectors 26 may take any suitable form for electrically connecting with complementary electrical connectors 34 on one or more of the functional modules 16 when operatively connected with the handheld base 14. The electrical connectors 26 allow for transmission of data, control, and/or power signals between the handheld base 14 and an operatively connected functional module 16. Thus, the electrical connectors 26 are operatively connected to the power source 24 and/or computer processor 20 in any suitable functional manner understood in the art.

One or more software modules 30 are accessible to the computer processor 20. The software modules 30 may be located directly within the handheld base 14, such as within memory carried by the handheld base 14, or may be located remote from the handheld base 14 and accessed by the computer processor 20 via one or more communication paths, as would be well understood in the art. Each software module 30 is configured to perform a different functional task. Three such software modules 30a, 30b, and 30c are illustrated in FIG. 2 for exemplary purposes only. More or fewer software modules 30 may be accessible to the computer processor 20 as desired for enabling more or fewer specific functionalities of the maintenance tool 12.

The software 30 and/or the computer processor 20 is preferably configured to automatically detect which functional module or modules 16 are operatively attached to the handheld base 14 and then decide which software applications 30 are to enabled for use to the user. Each software module 30 can be selectively enabled. For example, operatively attaching a specific functional module 16 to the handheld base 14 may cause the computer processor 20 to allow only a specific subset of the software modules 30 to be accessed by a user, depending on the functional tasks to be performed by the functional module 16. In addition, the user can select a specific software module to enable for use, for example, by touching or otherwise selecting an icon on the display 22. When a specific software module 30 is selected and a corresponding functional module 16 is operatively mounted to the handheld base 14, the maintenance tool 12 can be used to perform specific maintenance and/or other functions driven by the selected software module 30.

Input keys 32 carried by the handheld base 14 allow commands and/or other information can be input to the handheld base 14 by a user. In the illustrated example, the input keys 32 are physical keys, such as push buttons and multi-directional buttons. However, the input keys 32 may also include virtual keys, for example, that are displayed on the display screen 22 and can be selected and/or otherwise used to input commands and/or information to the computer processor 22 and associated circuitry.

Each functional module 16 includes a second set of electrical connectors 34 and a computer control circuit 36. The second set of electrical connectors 34 and the computer control circuit carried together as a unit by a second housing 38. The electrical connectors 34 operatively couple with corresponding electrical connectors 26 on the handheld base 14 to allow data and/or power transmission between the functional module 16 and the handheld base 14. The computer control circuit 36 is configured to perform the functional task or tasks associated with that particular functional module. The computer control circuit 36 may include, for example, software and/or hardware with instructions, data, and/or circuitry that provides specific functionality of the functional module 16 to perform one or more pre-selected functional tasks. The computer control circuit 36 may interact with the computer processor 20 and/or one or more of the software modules 30 to enable the maintenance tool 12 to perform the respective pre-selected functions only when the functional module 16 is operatively mounted to the handheld base 14.

The computer control circuit 36 may also optionally include a computer data storage memory of any type suitable for storing data associated with the functionality of the functional module. The memory may be used to store data collected with the functional module 16. The memory may be used to store data to be used for the control of the functional module 16. The memory may be used to transfer data held within the module, such as collected data from the field, to other computers for further processing.

In some arrangements, the electrical connectors 26 and 34 include complementary digital connections, such as universal serial bus (USB) connectors, UART, or similar connections. The electrical connectors 26 and 34 may include other types of plug-and-socket type connectors, or similarly easily coupled electrical power and/or data connectors, as would be well understood in the art.

Depending on the preselected function task or tasks associated with the functional module 16, the functional module may also optionally include one or more interface connections 40 for operatively connecting to an equipment asset, field device, and/or control loop at the process control system. The interface connections 40 are preferably also carried by the second housing 38 as a self-contained unit with the computer control circuit 36 and the electrical connectors 34. The specific type and form of the interface connection 40 depends on the functional task or tasks to be performed by the functional module 16 relative to the field devices of the process control system. Thus, the interface connections 40 may include FF and/or HART connectors; data collection connectors; power supply connectors, and so on. Some functional modules may not have any interface connections 40. Some specific exemplary interface connections 40*a-h* are described in further detail hereinafter.

Each functional module 16*a-d* releasably and operatively attaches separately to the handheld base 14 in the operatively mounted position by any suitable securement mechanism readily understood in the art. For example, the functional module 16 may operatively mount or couple to the handheld base 14 with fasteners, such as screws, and/or releasably interlocking mechanism, such as interlocking clips and/or magnets or the like.

The handheld base 14 in FIG. 2 is shown configured to be able to be operatively coupled to a single functional module. However, in some arrangements, the handheld base 14 may be configured to operatively mount to two or more than two different functional modules 16 at the same time. Preferably, each functional module both physically attaches to the handheld base 14, for example, with clips or screws, and also electrically connects to the handheld base 14, for example with complementary interconnecting electrical connectors 26. Different functional modules 16 may be configured to be mounted to the handheld base 14 in different mounting positions around the outer surface of the handheld base 14. Further, Even if the handheld base 14 is configured to operatively mount to two or more functional modules 16, the maintenance tool 12 preferably also functions with fewer than all of the possible number of functional modules 16 attached. Thus, for example, a handheld base 14 that is configured to operatively couple with two different functional modules 16 at the same time may still operate with only one functional module 16 operatively mounted thereto.

When operatively attached to the handheld base 12, the second set of electrical connectors 34 on the functional module 16 operatively couple to the first set of electrical connectors 26 on the handheld base 14, thereby providing an electrical data and/or power connection there between. Preferably, each functional module 16 has an exterior mating surface that is complementary to a portion of an exterior mating surface of the handheld base 14 so as to mate to the exterior surface of the first housing when the functional module is operatively mounted to the handheld base. In one arrangement, the housing 28 of handheld base 14 has a first mating surface 42 surrounding the electrical connectors 26, and the housing 38 of each functional module 16 has a second mating surface 44 that is complementary to the first mating surface 42. When a functional module 16 is operatively mounted to the handheld base 14, the first mating surface 42 is engaged against and opposing the second mating surface 44, and the electrical connectors 26 operatively connect with the electrical connectors 34 to provide both a physical connection and an electrical and/or data connection between the functional module 16 and the handheld base 14.

When operatively attached to the handheld base 14, each functional module 16 interacts with at least one of the software modules 30 executed by the handheld base 14 to perform the pre-selected functional tasks for which the particular functional module 16 is designed. The computer control circuit 36 of the functional module interacts with the computer processor 20 of the handheld to enable the maintenance tool 12 to perform the functional task associated with the functional module 16 when properly operatively connected together. For functional modules 16 that operatively connect with one or more field devices, for example, via the interface connections, the software module 30 and/or computer control circuit 36 may allow the maintenance tool 12 to perform the functional task only when the functional module 16 is operatively connected to the appropriate field device.

Preferably, the handheld base 14 recognizes the functional module 16, That is, the handheld base 14 recognizes which functional module, (e.g., 16*a*, 16*b*, 16*c*, or 16*d*) of the various different functional modules 16 that can be connected to the handheld base. To do this, the computer processor 20 of the handheld base 14 reads information provided by the computer control circuit 36 of the functional module 16 when operatively coupled together. The computer processor 20 then recognizes the particular functional module as being, for example, a communicator module or a vibration data collector module, and so on. Based on the which functional module 16 is operatively attached to the handheld base 14, the computer processor 20 may enable only certain software modules 30 in order to allow the maintenance tool 12 to perform only the functional tasks for which the selected functional module is designed to perform. For example, if the functional module 16 is a field communicator module, (e.g., 16*c*) the computer processor 20 may identify it as such and enables only software modules 30 appropriate for performing the functions of the communication module. Similarly, if the functional module 16 is a vibration data collector, (e.g., 16*b*) the computer processor 20 may identify it as such and enables only software modules 30 appropriate for collection of vibration data.

The maintenance tool 12 has a form factor for easily being carried and used by hand by a person, such as a field technician. Thus, the handheld base 14 and the functional modules are shaped and sized as a hand-held unit to allow for easy carrying and handling by the user when operatively coupled together. For example and without express limitation thereto, the housing 28 and the housing 38, when operatively coupled together, are preferably not larger than about 30 cm×30 cm×30 cm and the handheld base 14 preferably weighs less than about 10 kg, and more preferably less than approximately 25 cm×20 cm×4 cm and preferably weighs less than about 5 kg. Different dimensions and weights may be used depending on the specific ergonomic and/or other technical and/or aesthetic considerations as long as the handheld base 14 is shaped and sized for easy handheld handling and carrying by a person.

The handheld base 14 and the functional modules 16 are preferably constructed so as to be intrinsically safe for use and/or operative coupling and/or uncoupling in hazardous areas. Preferably, the tool system 10 is designed such that maintenance tool 12 is intrinsically safe with any functional module 16. That is, each combination of the handheld base 14 operatively attached with each different functional module 16, such as with each of the functional modules 16*a-d*, is designed to be incapable of producing heat or spark sufficient to ignite an explosive atmosphere. Preferably, each combination of handheld base 14 and functional module 16, either separately or operatively coupled together, is certified as being intrinsically safe, that is, safe for use in a hazardous area, such as in a Class I, Division 1 area under the ANSI/NEC classification system or a similar area with flammable or explosive atmospheres.

A particular advantage of the field maintenance system tool system 10 is the ability to leverage the common features found across many different field maintenance tools into the single handheld base 14 and splitting apart only the portions of the field maintenance tools unique for a particular maintenance function into the different interchangeable functional modules 16. Thus, instead of a field technician having to carry a separate dedicated tool for each function, each dedicated tool having its own battery, display screen, input keys, computer processor, and so on, the field technician can carry a single handheld base 14 with only one set of battery, display screen, input keys, computer processor, and so on, and only needs to carry a few small, different functional modules for attachment to the handheld base 14. Thus, the portable field maintenance tool system 10 can significantly reduce the weight and number of items that the field technician has to carry into the plant. Further, it can be seen that any number of different types of functional modules 16 can be provided for use with a given handheld base 14. Following is a description of a few exemplary functional modules, it being understood that the tool system 10 is not necessarily limited to the specific exemplary functional modules 16a-h expressly described.

FIG. 2 shows the functional module 16c in greater detail, which is a field communicator module for communications on one or more communication protocols. The functional module 16e has the electrical connectors 34 and computer control circuit 36 carried by the housing 38, and operatively mounts to the handheld base 14, as described previously. The functional module 16c also includes interface connections 40a, 40b, and 40c for connecting to a field device or control loop or bus. Interface connections 40a are two terminals for connecting to a HART control loop or device and configured for HART communication. Interface connections 40b are two terminals for connecting to a HART control loop or device and configured for HART communication and providing loop power. Interface connections 40c are two terminals for connecting to a FOUNDATION fieldbus control bus or device and configured for FOUNDATION fieldbus communication. In addition, interface connection 40d is a terminal for connecting to a FOUNDATION fieldbus control bus or device and configured for providing FOUNDATION fieldbus power. Here, the computer control circuit 36 includes circuitry and programming unique to the functioning of the functional module 16c as a standard HART and FOUNDATION fieldbus communications module, as well as identifying the functional module 16c as a standard communication module to the computer processor 20 of the handheld base 14. In some arrangements, one or more of the terminals 40a-d or additional terminals 40 may be configured and/or provided for connection with other industrial protocols, such as WirelessHART, PROFIBUS PA, PROFIBUS DP, or still other protocols.

Figure 3:
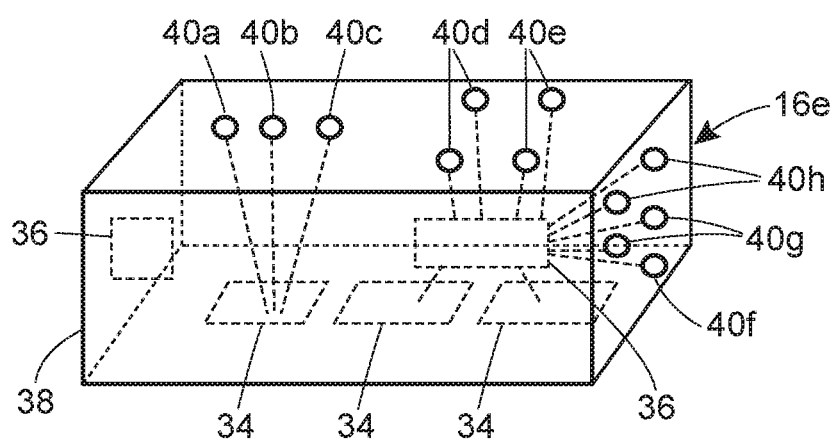
FIG. 3 is a schematic diagram of a functional module for operative use with the portable handheld field maintenance tool of FIG. 2 configured to calibrate a field device of a process control system in the plant.

In FIG. 3, a functional module 16e is a field device calibrator module, which is configured for calibrating field devices in the process control system. The functional module 16e has the electrical connectors 34 and computer control circuit 36 carried by the housing 38, and operatively mounts to the handheld base 14, as described previously. The functional module 16e also includes interface connections 40a, 40b, 40c, and 40d, as described previously. In addition, the functional module 16e includes interface connections 40e, 40f, 40g, and 40h. Interface connections 40e are two terminals for an ammeter circuit within the functional module 16e and configured to connect to the field devices and/or control loop and/or bus wiring. Interface connection 40f is a connector for a multi-pin cable for connecting to an external pressure module. Interface connections 40g are two terminals for connecting to a thermocouple. Interface connections 40h are two terminals for a resistance temperature detector (RTD) connection. The interface connections 40e may optionally be omitted from the functional module 16e. In this case, the computer control circuit 36 includes circuitry and programming unique to the functioning of the functional module 16e as a calibration tool for use on one or more field devices of a process control system.

Figure 4:
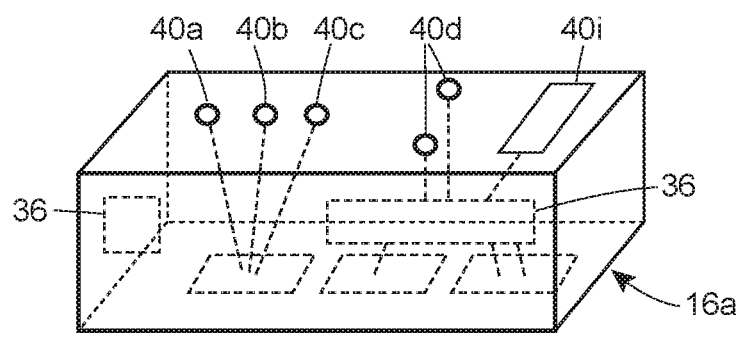
FIG. 4 is a schematic diagram of a functional module for operative use with the portable handheld field maintenance tool of FIG. 2 configured to read a bar code and/or RFID tag of an equipment asset in the plant.

In FIG. 4, the functional module 16a is an RFID reader and barcode reader module. The functional module 16a has the electrical connectors 34 and computer control circuit 36 carried by the housing 38, and operatively mounts to the handheld base 14, and also includes interface connections 40a, 40b, 40c, and 40d, as described previously. In addition, the functional module 16a includes an interface connection 40i that is a barcode reader, and the computer control circuit 36 includes control circuitry specific for operatively controlling the RFID reader and barcode reader.

Figure 5:
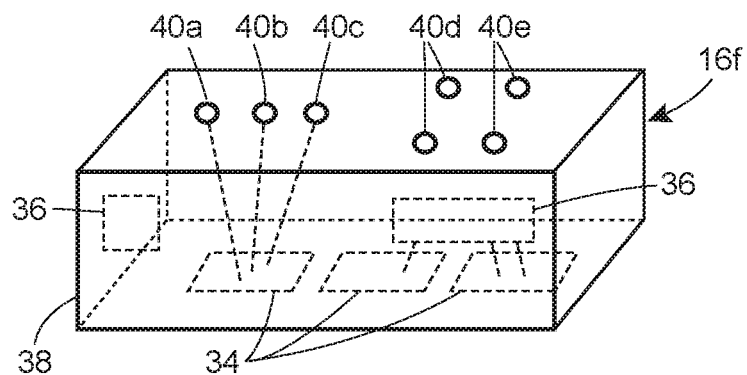
FIG. 5 is a schematic diagram of a functional module for operative use with the portable handheld field maintenance tool of FIG. 2 configured to perform diagnostics on a power loop or bus of the process control system.

In FIG. 5, another functional module 16f is a loop/segment diagnostics module. The functional module 16f has the electrical connectors 34 and computer control circuit 36 carried by the housing 38, and operatively mounts to the handheld base 14, and also includes interface connections 40a, 40b, 40c, 40d, and 40e, as described previously. In addition, the computer control circuit 36 includes control circuitry specific for diagnosing, such as by validating, circuitry of a control loop or bus and/or field device of a process control system.

Optionally, data collected and/or derived by the maintenance tool 12 while implementing a first one of the functional modules 16 may be stored and used while implementing a second one of the functional modules 16. For example, in some arrangements, and data downloaded with a first functional module 16 can be stored in memory associated with the computer processor 20 and later accessed and/or used when the handheld base 14 is operatively coupled to a second functional module 16. Similarly, data that is derived when the handheld base 14 is operatively coupled to a first functional module 16 may be stored in memory associated with computer processor 20 and later accessed and/or used when the handheld base is operatively coupled to a second functional module 16. In this way, the tool system 10 makes it possible for measurements, data, and analysis generated or collecting using one functional module to be stored and available for use in a different functional module. For example, device configuration data, electrical measurements, and/or vibration data collected with a first module may be stored and later used with a second module. As an example, troubleshooting a problematic measurement instrument could be enhanced by pairing device configuration data collected with a device communication functional module 16 with electrical measurements made on the process loop using an electrical measurements functional module 16. The functional modules may include memory data storage within the module itself, which could be used to more easily transfer data collected simply with the module itself rather than having to download from the base unit.

Figure 6:
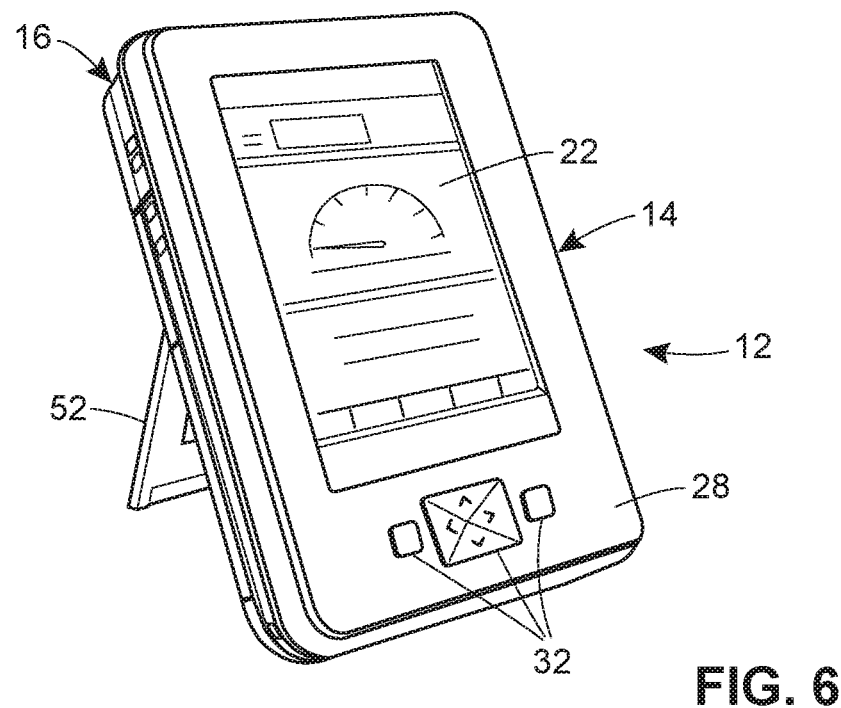
FIG. 6 is a front isometric view of a portable handheld field tool according to a particular aesthetic arrangement with a functional module operatively mounted to a handheld base.

FIG. 6 illustrates the portable field maintenance tool 12 arranged in one possible aesthetic design with a functional module 16 operatively attached to the handheld base 14. The maintenance tool 12 is part of the tool system 10 for performing one or more pre-selected tasks to portions of a process control system, as described previously herein. The maintenance tool 12 includes the handheld base 14 and one or more functional modules 16 that operatively mount the handheld base, all as described previously herein and to which the reader is directed for additional specific details thereof.

Figure 7:
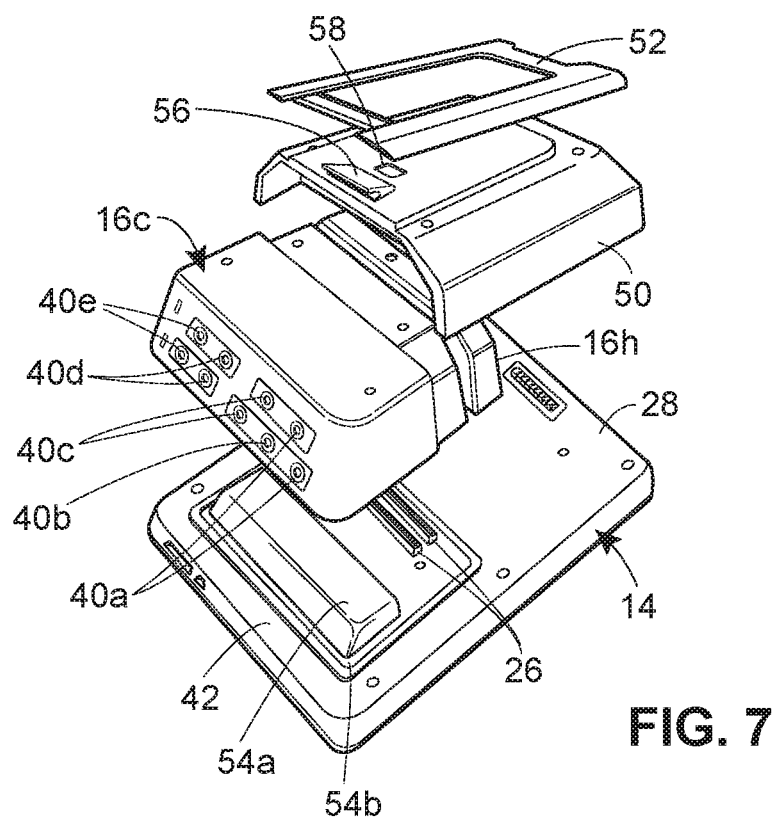
FIG. 7 is a rear isometric view of the portable handheld field tool of FIG. 6. with a functional module and portions of a cover shown in an unmounted position.

As best seen in FIG. 7 one exemplary mounting arrangement for operatively attaching a functional module 16 to the handheld base 14 includes a power module 50 and an optional folding stand 52. In this particular example, the functional module 16 is the functional module 16c described previously herein. However, any one of the functional modules 16 disclosed herein could be similarly configured and operatively mounted to the handheld base 14. Also shown in this example is an optional camera module 16h.

In this arrangement, the housing 28 of the handheld base 14 has a generally rectangular cubic shape and the functional module 16 has a shorter prismatic shape. The display 22 and input keys 32 are disposed on a front face of the housing 28. The electrical connectors 26 are disposed on a back face of the housing 28. The mating surface 42 of the housing 28 optionally includes various surface relief features 54, such as an elongate raised protrusion 54a adjacent the electrical connectors 26 and a raised rectangular frame 54b surrounding the electrical connectors and the raised protrusion 54a. The functional module 16 has complementary surface relief features (not visible) at its mating surface 44 so that the functional module 16 operatively attaches to the back face of the housing 28 in only a single predefined arrangement. The surface relief features 54 may take nearly any shape, number, and/or form, or may be omitted entirely, as long as the mating surface 42 and any such surface relief features are complementary to the mating surface 44 of the functional module 16 in a way that allows the electrical connectors 34 of the functional module to operatively connect to the electrical connectors 26 and allow the housing 38 of the functional module to be releasably attached to the housing 28 of the handheld base. Once operatively mounted, the functional module 16 may be releasably secured to the handheld base 14 with a releasable fastener, such as screws, clips, or brackets.

In this arrangement, the handheld base 14 is configured to be able to be operatively coupled to up to two different functional modules 16 at the same time. In the example of FIG. 7, maintenance tool 12 is shown with the functional module 16c and the camera module 16h to be operatively mounted to the handheld base 14. However, different functional modules 16 may be configured to be mounted to the handheld base 14. In this arrangement, the functional module 16c is configured to mount at the top end of the back wall of the handheld base 14, and the camera module 16h is configured to mount to the back wall of the handheld base directly adjacent and below the functional module 16c. A first (upper) set of the electrical connectors 26 is configured to operatively connect with the first functional module, such as the functional module 16c, and a second (lower) set of the electrical connectors 26 is configured to operatively connect with the second functional module 16, such as the camera module 16h. However, other spatial configurations may be used. Some users may not desire to have the maintenance tool 12 have a camera, for example, for plant security and/or other reasons, in which case the camera module 16h may simply not be operatively attached to the handheld base 14 and/or a blank module may be attached to the handheld base 14 at the mounting position of the camera module to take up the empty space. Alternatively, a different functional module 16 may be operatively attached in lieu of the camera module 16h.

With the functional module 16 (and optionally the camera module 16h or a blank module) operatively mounted to the back face of the housing 28, the power module 50 mounts over the back surface of the functional module 16 and the camera module 16h. The power module 50 includes a back cover plate and a power source, such as a battery, configured to powering the handheld base 14 and/or one or more additional modules 16 operatively attached to the handheld base 14. In some arrangements, the power module 50 includes rechargeable batteries and a DC electrical input receptacle for charging the batteries. Four Lithium-Ion batteries may be used, or other battery arrangements may be used. The power module 50 also includes circuitry configured to provide appropriate power to the handheld base 14. Preferably, the circuitry is configured to allow intrinsically safe use of the assembled maintenance tool 12 in a hazardous area with power from the battery. The circuitry of the power module 50 may also be configured to be intrinsically safe while swapping out (i.e., disconnecting, changing, and/or connecting) power modules in a hazardous area. The circuitry may also be configured to provide additional functions. In some arrangements, the circuitry includes three circuit boards for power regulation, charging circuitry, IS barriers, etc.; however, other circuitry arrangements are also possible. The cover plate portion of the power module 50 preferably forms the back surface of the maintenance tool 12 when operatively attached to the handheld base 14 and covers at least a portion of the back surface, left and right side surfaces, and the bottom surface of the functional module while leaving the top surface with the interface connections 40a-e exposed for access during use of the maintenance tool 12. The power module 50 also covers the back surface, left and right side surfaces, and top and bottom surfaces of the camera module 16h and includes a small window 58, which can expose the camera lens and/or a flash on the camera module 16h or expose a light on a flashlight module, for example. The power module 50 may be releasably secured to the handheld base in this position with a releasable fastener, such as screws, clips, or brackets.

Figure 8:
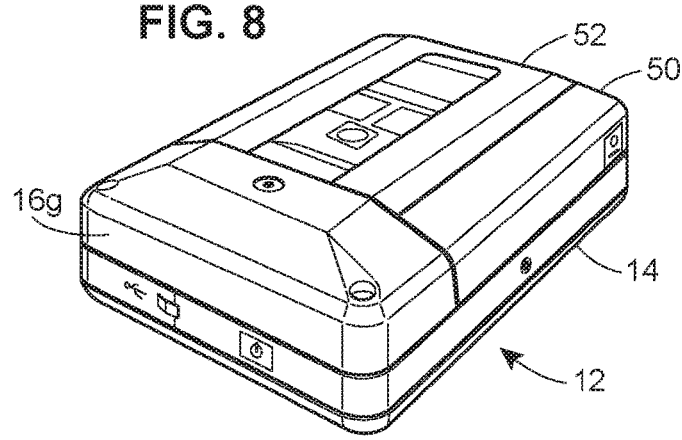
FIG. 8 is a rear isometric view of the field maintenance tool of FIGS. 5 and 6 having a functional module that operates as a blank operatively mounted to the handheld base.
Figure 9:
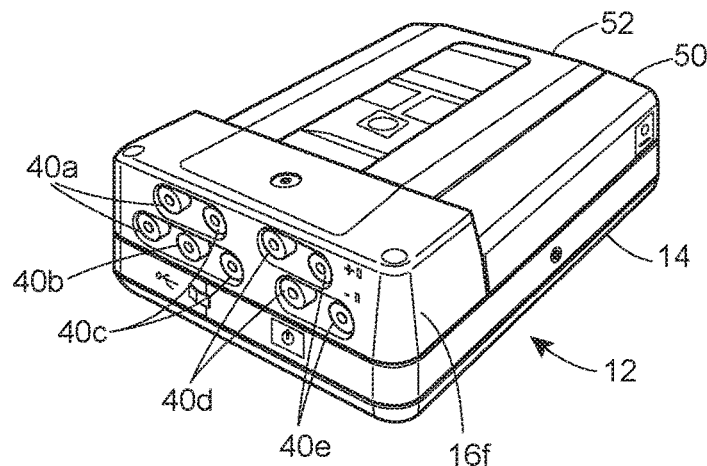
FIG. 9 is a rear isometric view of the field maintenance tool of FIGS. 5 and 6 having a functional module that operates as a device communicator and/or a loop power tool and/or a validation tool operatively mounted to the handheld base.
Figure 10:
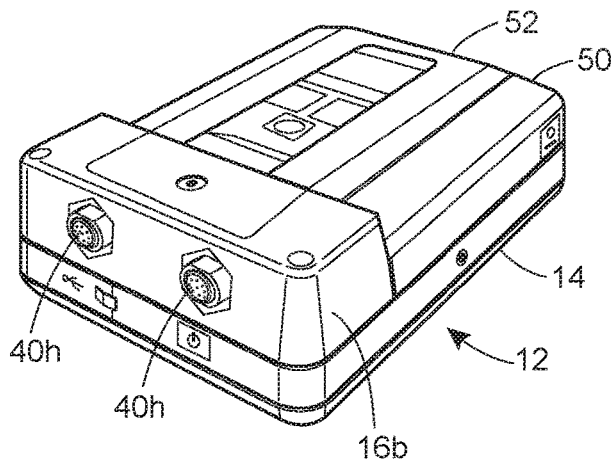
FIG. 10 is a rear isometric view of the field maintenance tool of FIGS. 5 and 6 having a functional module that operates as a vibration data collector mounted to the handheld base.

The folding stand 52 is pivotably coupled to the back cover plate 50 at a hinge 56. The folding stand 52 preferably pivots about the hinge 56 between a flat position against the back cover plate 50 (as shown in FIGS. 8-10) and an outwardly pivoted position from the back cover plate 50, as best seen in FIG. 6. In the outwardly pivoted position, the folding stand 52 can be used to prop the maintenance tool 12 in an upright position, as shown in FIG. 6, which may make it easier for a user to read the electronic display 22 and use the input keys 32 without having to hold onto the maintenance tool 12 with one of his or her hands. Preferably, the folding stand 52 releasably locks into the folded flat position, for example with a snap fit against the back cover plate 50 or with another form of releasable latch.

FIGS. 8-10 illustrate the maintenance tool 12 of FIGS. 6 and 7 with various different functional modules 16, each having a shape, size, and form configured to operatively mount to the handheld base 14 shown in FIGS. 6 and 7 as described previously herein.

In FIG. 8, a functional module 16g is operatively attached to the handheld base 14. The functional module 16g is a blank functional module, which does not include any interface connections 40 for interfacing with any various field devices of a process control system. Rather, the functional module 16g simply allows, provides, and/or enables the handheld base 14 to run various software modules 30 and/or other mobile worker applications that do not require direct interaction with a field device. The functional module 16g may include a computer control circuit 36, including hardware and/or software, that interacts with the computer processor 20 to provide and/or enable one or more software applications to be run by the user. Alternatively, the functional module 16g may simply provide a blank cover for the electrical connectors 26, and the computer processor 20 may selected ones of the software modules 30 without functionally interacting with anything in the functional module 16g.

In FIG. 9, the functional module 16f for providing communications, loop power, and/or validation functionality, as previously described herein, is shown operatively mounted to the handheld base 14 shown in FIGS. 6 and 7.

In FIG. 10, the functional module 16b as previously described herein is shown operatively mounted to the handheld base 14 shown in FIGS. 6 and 7. Here can be seen two interface connections 40h disposed on the top side of the housing 38 configured to connect to one or more vibration sensors. The functional module 16b also includes electrical connectors 34 and computer control circuit 36 disposed within the housing 38 as previously described herein, as well as a mating surface 44 that is complementary to the mating surface 42 seen in FIG. 7. The computer control circuit 36 includes hardware and/or software uniquely configured to collect and/or measure vibration data received through the interface connections 40h, for example from a valve or valve actuator or other field device. When operatively coupled to the handheld base 14, the computer processor 20 recognizes the functional module 16b so that a pre-defined subset of the software modules 30 may be initiated to perform certain functional tasks, including for example, measuring, collecting, and/or analyzing vibration data collected via the interface connections 40h.

Turning again to FIG. 7, The functional module 16d provides wireless communication with one or more field devices in the plant. The functional module 16d has the electrical connectors 34 and computer control circuit 36 carried by the housing 38, and operatively mounts to the handheld base 14, as described previously. In addition, the functional module 16d includes a wireless transmitter and/or receiver located inside the housing 38 for transmitting and/or receiving wireless communication signals. The functional module 16d may be provided as a standalone wireless communicator or may integrate one or more other features for performing other functional tasks of any of the other functional modules described herein. Thus, in some arrangements, the wireless communication functionality of the functional module 16d may be integrated in an with any of the other functional modules 16 described herein.

Although a number of exemplary functional modules 16 are described herein, it should be clear to the reader that various functional features and associated hardware and/or software of any one or more of the functional modules may be combined in an almost infinite variety of combinations. For example, additional functional modules may be provided that function as a camera, a flashlight, or a laser tachometer in any manner understood in the art. Therefore, it is to be understood that any one of the functional modules 16 described herein may include any one or more of the functional features and associated hardware and/or software of any one of the other functional modules 16 described herein. In addition, any one of the functional modules 16 described herein may include additional functional features and associated hardware and/or software to perform other functional tasks when operatively attached to the handheld base 14. In fact, one particular functional benefit of the portable field maintenance tool system 10 disclosed herein is the ability to expand the use of the handheld base 14 to combine with an almost infinite number of different types of functional modules 16, which can be developed in the future to perform specific functional tasks on the process control system without having to duplicate the shared common features of the handheld base 14, such as the computer processor 20, the display 20, the power source 24, and the input keys 32. Rather, additional software modules 30 for operating a new functional module 16 and/or new functional features of a functional module 16 may be relatively easily added for access by the handheld base 14, for example by loading into resident memory within the computer processor 20 and/or by accessing a remote memory storage. A tool system as described herein may allow the handheld base to be used with another functional module while a particular functional module is being serviced and/or calibrated. Further, the common system software and user interface on the handheld base may simplify training and/or use for multiple tasks, which normally would have required separate tools, each with their own unique user interface, software, and menus.

This detailed description is to be construed as exemplary only and does not describe every possible embodiment, as describing every possible embodiment would be impractical, if not impossible. One could implement numerous alternate embodiments, using either current technology or technology developed after the filing date of this application. Thus, while specific exemplary forms are illustrated and described herein, it is to be understood that any of the various aspects, arrangements, and/or features disclosed herein may be combined with any one or more of the other aspects, arrangements, and/or features disclosed herein in a functional and useful manner that would be understood by a person of ordinary skill in view of the teachings of this disclosure.

We claim:

1. A portable field maintenance tool system for performing a plurality of different functional tasks on equipment assets in a plant, the portable field maintenance tool system comprising:
    a handheld base comprising a computer processor, an electronic display to display information from the computer processor, a power source that provides power to the computer processor and the electronic display, and a plurality of first electrical connectors operatively carried together by a first housing that is shaped and sized as a hand-held unit;
    a plurality of software modules accessible by the computer processor, each software module configured to perform a different functional task to a field device of a process control system; and
    a plurality of functional modules for attachment to the handheld base, each functional module comprising a second set of electrical connectors that releasably couple with the first electrical connectors and a computer control circuit configured to perform the functional task, the second set of electrical connectors, and the computer control circuit carried together as a unit by a second housing;
    wherein each functional module releasably and operatively attaches separately to the handheld base with the second set of electrical connectors coupled to one or more of the first electrical connectors, and wherein each functional module, when operatively attached to the handheld base, interacts with at least one respective one of the software modules to perform a selected one of the functional tasks.

2. The portable field maintenance tool system of claim 1, wherein at least one of the functional modules includes at least one interface connection that operatively connects to a field device to perform at least one of the functional tasks.

3. The portable field maintenance tool system of claim 1, wherein the handheld base and each functional module, when operatively attached to the handheld base, is intrinsically safe.

4. The portable field maintenance tool system of claim 1, wherein the computer processor is configured to recognize which of the plurality of functional modules is operatively attached to the handheld base and to selectively enable a pre-selected subset of the software modules depending on which functional module is operatively attached to the handheld base.

5. The portable field maintenance tool system of claim 1, wherein the handheld base is configured to operatively attach to more than one of the functional modules simultaneously.

6. The portable field maintenance tool system of claim 1, wherein one of the functional modules comprises a device communicator.

7. The portable field maintenance tool system of claim 6, wherein the functional module further comprises a loop power and validation capability.

8. The portable field maintenance tool system of claim 7, wherein the functional module comprises a set of HART interface connections and a set of Fieldbus interface connections.

9. The portable field maintenance tool system of claim 1, wherein one of the functional modules comprises a data collector.

10. The portable field maintenance tool system of claim 9, wherein the functional module comprises a vibration data collector.

11. The portable field maintenance tool system of claim 1, wherein one of the functional modules comprises a calibrator.

12. The portable field maintenance tool system of claim 1, wherein one of the functional modules comprises a camera.

13. A portable handheld field maintenance tool for performing tasks on an equipment asset in a plant, the portable field maintenance tool comprising:
a handheld base comprising:
a first housing that is shaped and sized as a handheld unit, the first housing having in interior and an exterior;
a computer processor carried within the interior of the first housing;
an electronic display carried by the first housing to display information from the computer processor to the exterior of the first housing;
a power source carried within the first housing that provides power to the computer processor and the electronic display; and
a first set of electrical connectors carried by the first housing and operatively reachable from the exterior;
a software module accessible by the computer processor, the software module configured to perform a predefined functional task relative to an equipment asset in a plant; and
a functional module that is releasably mountable to the handheld base, the functional module comprising:

a second housing having an exterior mating surface that is complementary to a portion of an exterior surface of the first housing so as to lockingly mate to the exterior surface of the first housing when the functional module is operatively mounted to the handheld base;
a second set of electrical connectors carried by the second housing that operatively couple with the first set of electrical connectors when the functional module is operatively mounted to the handheld base;
at least one interface connection carried by the second housing that operatively connects to the field device to perform at least one pre-defined functional task; and
a computer control circuit that operatively connects to the computer processor to perform the predefined functional task when the functional module is operatively mounted to the handheld base;
wherein, when the functional module is operatively mounted to the handheld base and the second the interface connection is operatively connected to the equipment asset, the functional module interacts with the software module to perform the pre-defined functional task.

14. The portable field maintenance tool of claim 13, wherein the functional module includes a set of HART interface connections and a set of Fieldbus interface connections.

15. The portable field maintenance tool of claim 13, wherein the handheld base and the functional module are intrinsically safe when operatively mounted together.

16. The portable field maintenance tool of claim 15, wherein the handheld base and the functional module are intrinsically safe while being operatively connected together or disconnected from each other.

17. The portable field maintenance tool of claim 13, wherein the functional module is configured to configure and set-up a measurement instrument when operatively attached to the handheld base.

18. The portable field maintenance tool of claim 17, wherein the measurement instrument is a pressure transmitter.

19. The portable field maintenance tool of claim 13, wherein the functional module calibrates a temperature transmitter when operatively attached to the handheld base.

20. The portable field maintenance tool of claim 13, wherein the functional module measures electrical parameters of a field device when operatively attached to the handheld base.

21. The portable field maintenance tool of claim 13, wherein the functional module senses vibrations of a field device when operatively attached to the handheld base.

22. The portable field maintenance tool of claim 13, wherein the functional module implements device diagnostics to troubleshoot a field device when operatively attached to the handheld base.

23. The portable field maintenance tool of claim 13, wherein the handheld base comprises a user interface carried by the first housing.

24. The portable field maintenance tool of claim 13, wherein the computer processor is configured to recognize the functional module and to enable the software module from a plurality of different software modules based on the recognition of the functional module.

* * * * *